UNITED STATES PATENT OFFICE.

CHARLES CONQUEROR, OF JEANNETTE, PENNSYLVANIA.

FACING FOR FLATTENING-STONES.

SPECIFICATION forming part of Letters Patent No. 538,365, dated April 30, 1895.

Application filed November 12, 1894. Serial No. 528,598. (No specimens.)

*To all whom it may concern:*

Be it known that I, CHARLES CONQUEROR, of Jeannette, in the county of Westmoreland and State of Pennsylvania, have invented a new and useful Improvement in Facings for Flattening-Stones, of which the following is a full, clear, and exact description.

My invention relates to the flattening of glass cylinders in the manufacture of sheet glass, and is designed to prevent scratching and roughening of the glass on account of irregularities in the surface of the flattening stones.

To that end, it consists broadly in rubbing into the surface of the stone a facing which gives a smooth even surface, so that the glass is not injured.

In carrying out my invention in its prepared form, I make a mixture of German clay and red lead in about equal parts by weight, using enough oil to moisten the mixture and form a paste. This paste is then spread over the surface of the flattening stones and rubbed in preferably by a heavy glass polisher until it is dry. The oven is then heated up, thus baking the facing in place and the stones are ready for use.

The advantages of my invention will be apparent to those skilled in the art, since a smooth plane surface is attained and injury to the glass is prevented.

Many variations may be made in the proportions of the materials, the method of applying, &c., without departing from my invention, since

What I claim is—

1. The method of preparing flattening stones, consisting in rubbing a facing into the upper surface and baking the same in place; substantially as described.

2. A flattening stone having a facing of clay and red lead; substantially as described.

In testimony whereof I have hereunto set my hand.

CHARLES CONQUEROR.

Witnesses:
W. B. CORWIN,
H. M. CORWIN.